United States Patent [19]

Carden et al.

[11] Patent Number: 4,864,712

[45] Date of Patent: Sep. 12, 1989

[54] METHOD FOR PRODUCING A FABRIC COVERED METAL RAIL

[75] Inventors: L. Eugene Carden, Belden, Miss.; Richard N. Anderson, Owensboro, Ky.

[73] Assignee: Hunter Douglas Inc., Upper Saddle River, N.J.

[21] Appl. No.: 302,645

[22] Filed: Jan. 26, 1989

[51] Int. Cl.⁴ .............................................. B21D 35/00
[52] U.S. Cl. ..................................... 29/469.5; 29/521; 156/203; 156/209
[58] Field of Search ............... 156/203, 463, 224, 223, 156/216, 209, 65, 554, 549, 434; 160/178.1, 236; 428/190, 36.1; 29/24.5, 469.5, 33 D, 33 E, 521

[56] References Cited

U.S. PATENT DOCUMENTS

| | | | |
|---|---|---|---|
| 956,173 | 4/1910 | Rhoades | 156/554 |
| 2,222,842 | 11/1940 | Humphrey | 29/33 D |
| 4,656,086 | 4/1987 | Bowers et al. | 428/193 X |
| 4,793,396 | 12/1988 | Anderson et al. | 160/178.1 X |

Primary Examiner—Michael W. Ball
Assistant Examiner—Michele Yoder
Attorney, Agent, or Firm—Pennie & Edmonds

[57] ABSTRACT

A fabric covered metal rail suitable for use as a top or bottom rail in a fabric Venetian blind and method for producing such a rail by first laminating a fabric strip to a metal strip and then roll forming the laminated strip into the rail.

11 Claims, 9 Drawing Sheets

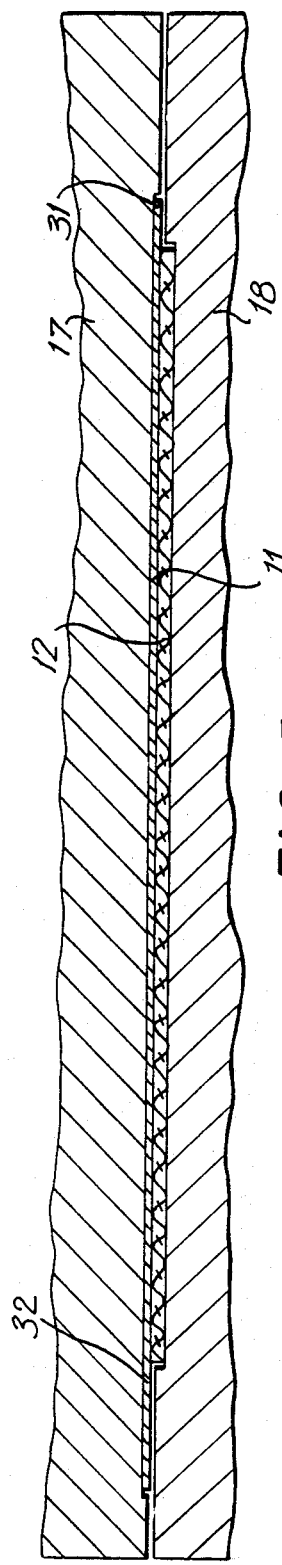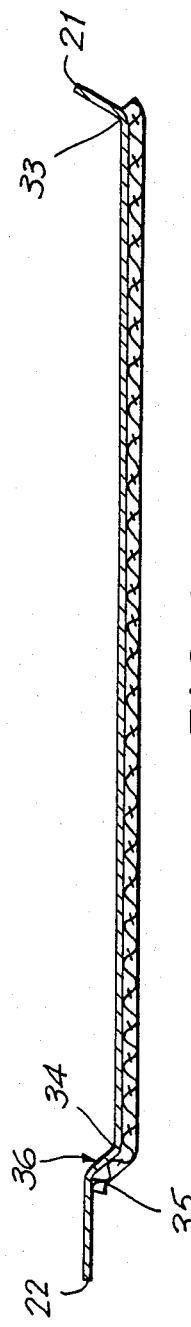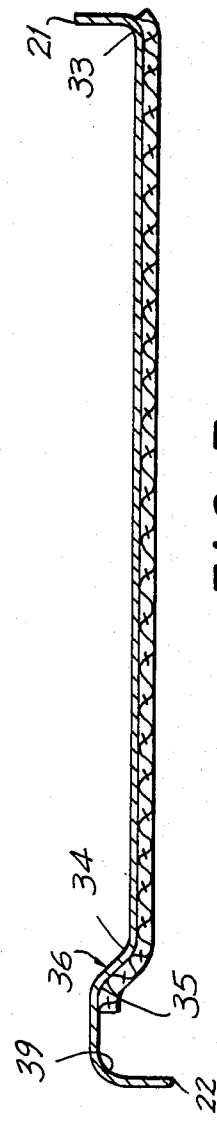

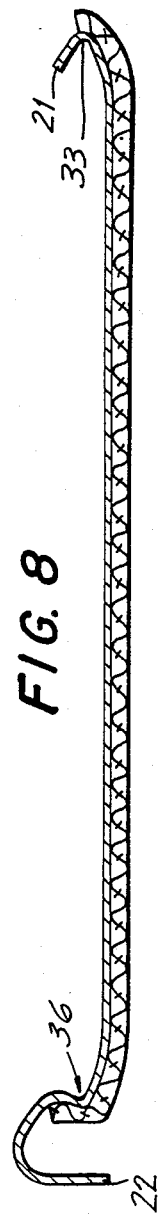
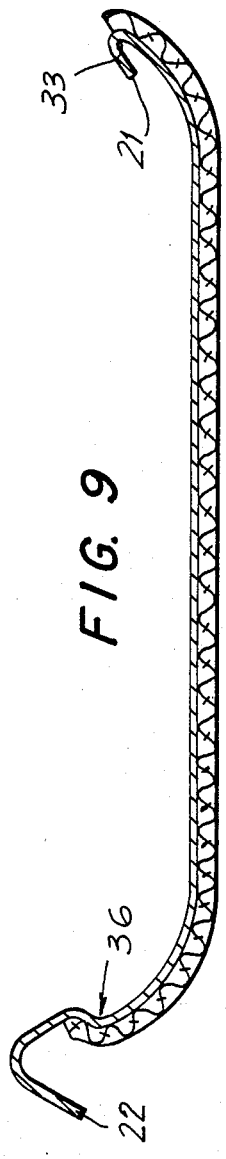
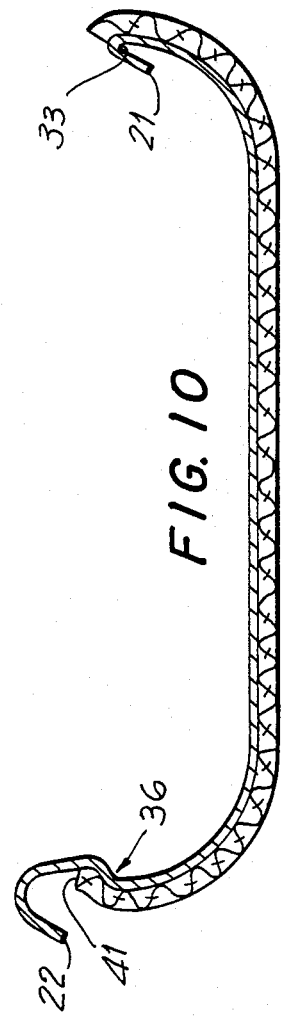

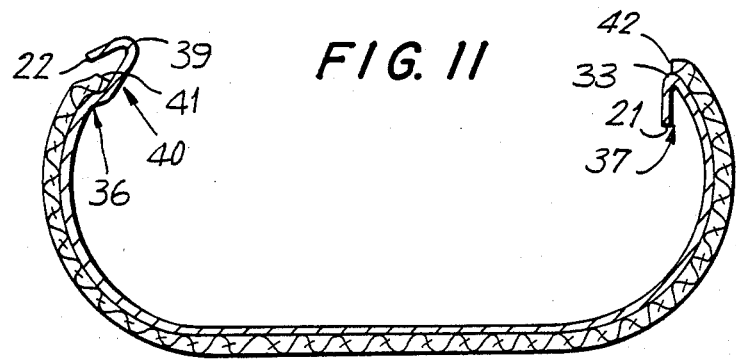
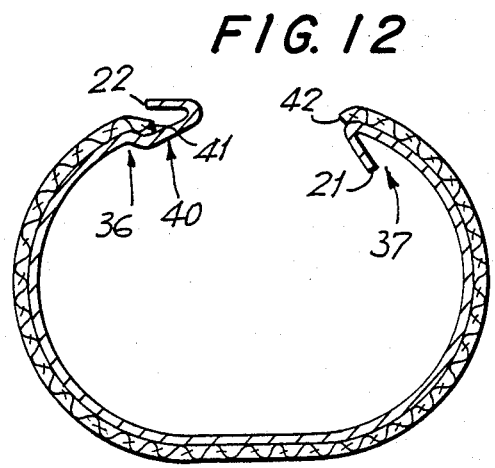
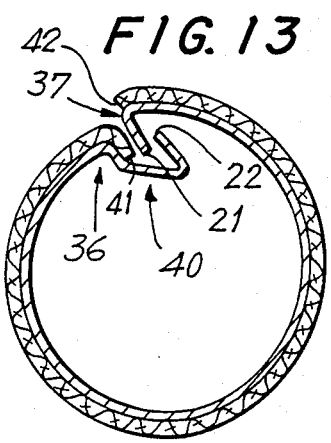

METHOD FOR PRODUCING A FABRIC COVERED METAL RAIL

BACKGROUND OF THE INVENTION

The invention relates to a fabric covered, tubular metal rail and a method for forming such a rail, in particular, such a rail closed with a lockseam and which is suitable as a bottom rail in a blind, e.g. a venetian blind or roller blind.

Blinds for covering windows are available in many different configurations and materials depending on the appearance desired. In one of these configurations a traditional, slatted Venetian blind may be provided with rigid fabric slats or metal slats covered by a fabric layer. It should be apparent that it is desirable that all the components of the blind have the same external appearance. However, the rigidized fabric or the thin sheet material from which the slats are made is not suitable for the head rail and the bottom rail of the blind which are the load bearing members. It is therefore necessary to make these rails out of a stronger material such as metal which will provide support for the blind, but does not have the desired appearance This is also true for the bottom rail of a roller blind whereby the actual blind material is a fabric sheet.

It is therefore an object of this invention to provide a metal rail and a method for making the rail suitable for use in a blind which has an outer appearance that matches the fabric of the slats or of the sheet material of such a blind.

SUMMARY

Accordingly, in the invention a strip of the fabric is first laminated with a strip of metal. The laminated fabric and metal is then roll formed into the tubular profile to form a fabric covered rail for the Venetian blind which matches the slats of the blind. The rail thus produced has sufficient strength and an outer appearance matching the blind slats.

BRIEF DESCRIPTION OF THE DRAWING

FIG. 5 shows a partial cross-section of a laminating roller taken along lines 5—5 of FIG. 1;

FIGS. 6-12 show cross-sections of the rail along lines 6—6 through 12—12 at different positions along a first set of roller dies illustrating the first roll forming steps of the present invention;

FIG. 13 shows a cross-section of the rail along lines 13—13 at the last position of a second set of roller dies illustrating the rail just before entering the locking head roller dies;

DETAILED DESCRIPTION OF THE INVENTION

Figure 1:
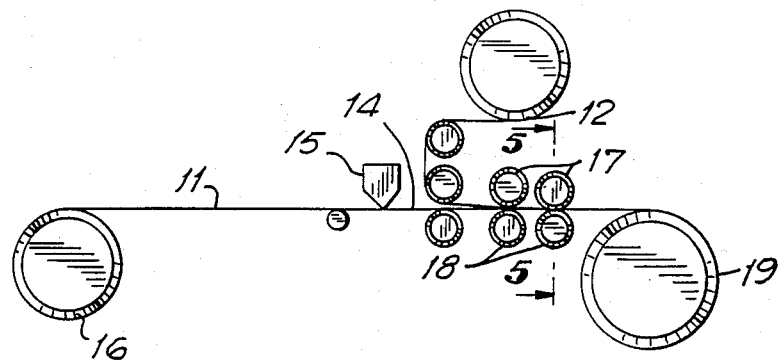
FIG. 1 is a schematic representation of the laminating step of the present invention.
Figure 3:
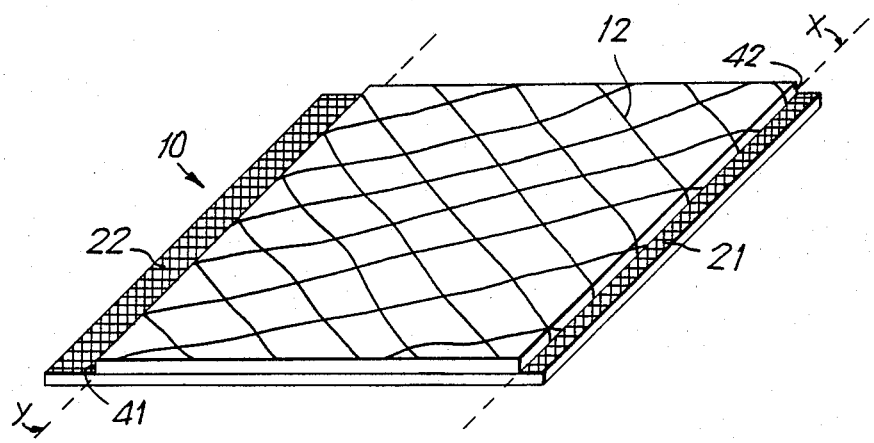
FIG. 3 shows a portion of the laminated strip of the present invention before the roll forming operation.
Figure 2:
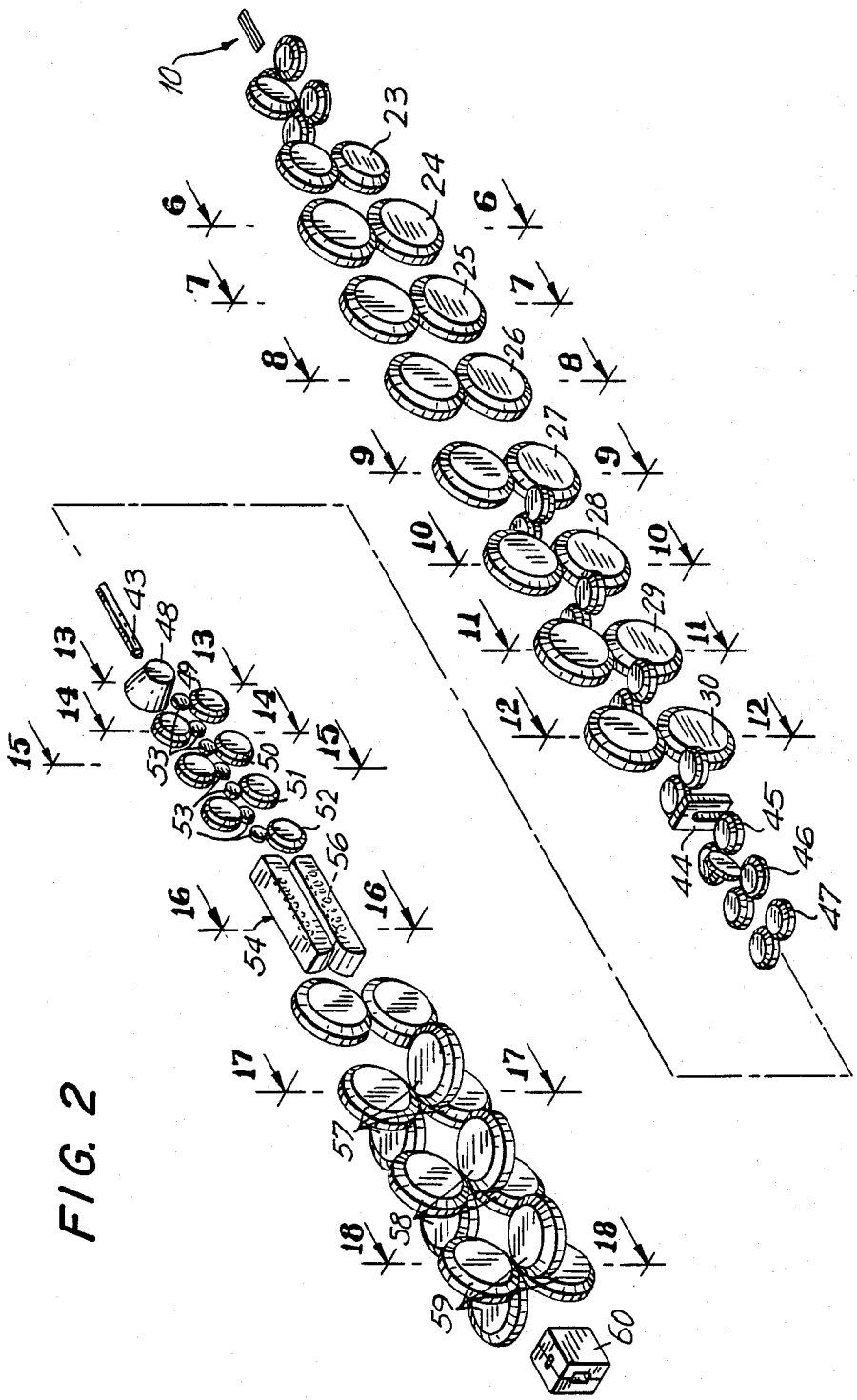
FIG. 2 is a schematic representation of the roll forming step of the present invention.
Figure 4:
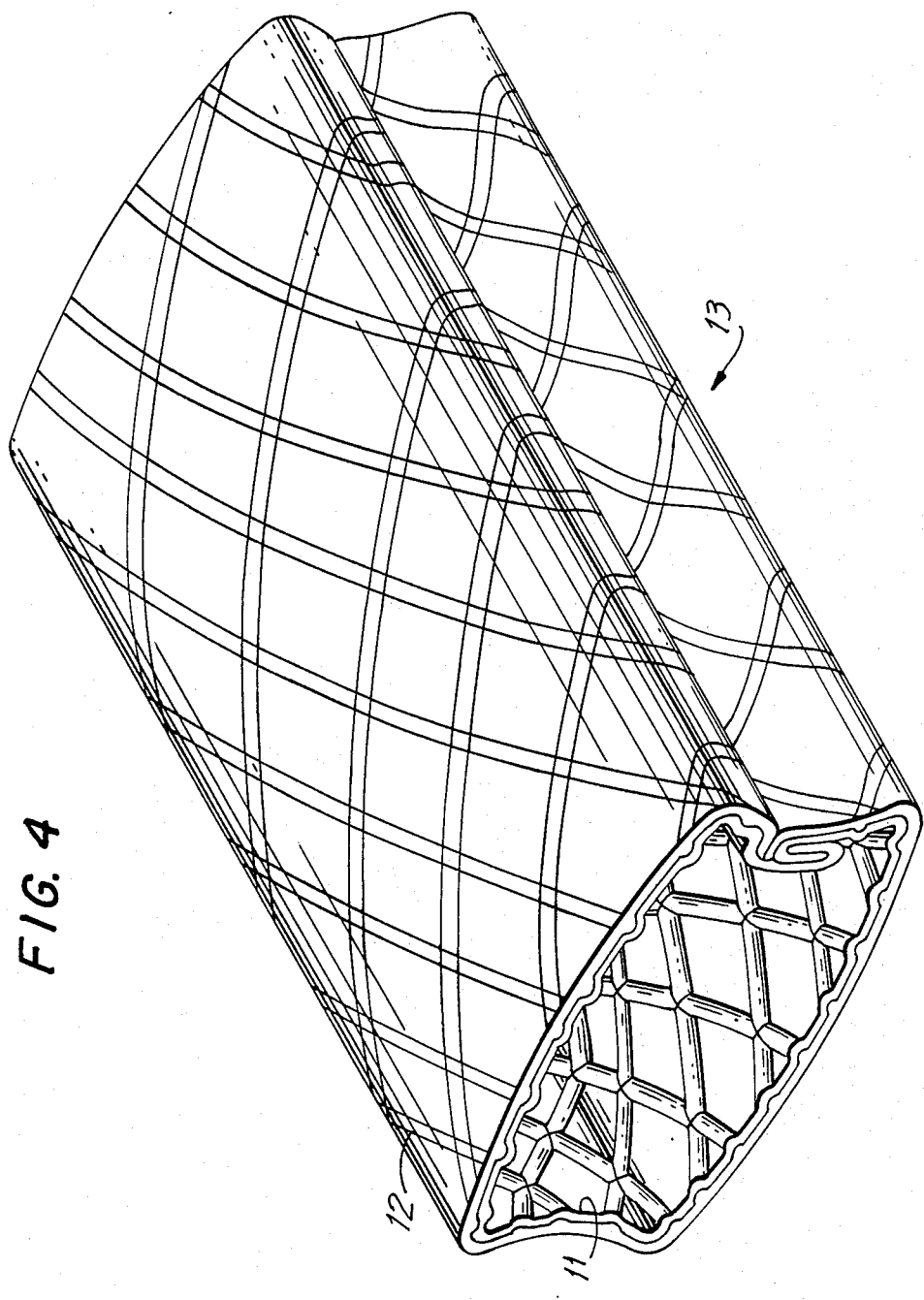
FIG. 4 shows a greatly enlarged portion of a rail formed by the method of the present invention.

The method of the present invention may be separated into two general steps, the laminating step illustrated in FIG. 1 and the roll forming step illustrated in FIG. 2. The laminated strip 10 comprised of a metal strip 11 and fabric strip 12 is shown in FIG. 3. The final rail product 13 is shown in FIG. 4. In the laminating step an adhesive material 14 is applied by a flow coating nozzle 15 to the metal strip 11 fed from a roll 16. The bonding together of the metal strip and the fabric strip is effected by placing an adhesive material on the metal strip and feeding the fabric strip 12 into overlying relation to and between the laminating rollers 17, 18. The resulting laminated strip 10 is then temporarily stored on a take-up roll 19.

The rollers 17, 18, shown in FIG. 2, are grooved to provide proper location of the fabric strip 12 on the metal strip 11 so that the fabric does not interfere with the subsequent formation of the rail. The grove in the upper laminating roller 17 has a width approximately the same as the width of the fabric strip 12 and a depth sufficient to accommodate the fabric.

The fabric strip 12, as shown in FIG. 3 and various other Figures, is located on the metal strip 11 between two reference lines X and Y adjacent the location along which the metal strip is to be bent in forming interlocking U-shaped lockseam parts of the lockseam. The location of the fabric is important, as will become apparent in the description of the roll forming step.

In the roll forming step, the laminated strip 10 is fed by feeding rollers 23 to a first set of roller dies 24–30 which gradually bend the laminated strip 10 into a circular but open tube. The ends of the rollers 23 are knurled and of a diameter to press against the upper and lower surfaces of the metal strip 11 outwardly of the reference lines X and Y. The two knurled roller ends produce a knurling or roughening of the metal strip adjacent its right and left longitudinal edges 21 and 22 where the metal extends beyond the fabric strip 12 and is exposed. This roughening assists in producing a tight slip-free lockseam in the final lockseam forming step described below.

FIGS. 6-12 illustrate the progression of the laminated strip 10 as it is roll formed into a circular open tube. In the progressive rolling of the laminated strip 10, the longitudinally extending and exposed portions 31 and 32 of the metal strip adjacent the edges 21 and 22 are first both bent upwardly to form bends 33 and 34 adjacent the right and left edges 21 and 22. It will be noticed from FIG. 6 that the bend 34 is spaced at a distance further from the associated longitudinal edge 22 of the metal strip than is the bend 33 from its associated edge 21. Furthermore, the strip outwardly of the bend 34 is folded back along another bend 35 to form a step 36.

With reference to FIGS. 7-12, it will be seen that the bend 33 is continued until a first U-shaped lockseam part 37 is formed. Also, the opposite longitudinal portion 32 of the metal strip beyond the bend 34 is folded down to form a bend 39 and this bend 39 is continued until a second U-shaped lockseam part 40 is formed. As also noted from these FIGS. 7-12, the first U-shaped lockseam part 37 faces inwardly of the rail, whereas the second U-shaped lockseam part 40 faces outwardly of the rail. Also, as shown in FIGS. 11, 12 and 13, the lockseam part 40 is disposed laterally outwardly of the left edge 41 of the fabric with the fabric extending down the step 36 and the edge 41 lying along the bottom of the step. In contrast, the right edge 42 of the fabric extends to the bend 33 of the first lockseam part.

As the laminated strip 10 is fed through the roller dies 24–30, a compression of the laminated strip is performed in addition to the roll forming operation. In particular, the fabric 12 is gradually compressed and actually embossed into the metal strip 11. This is shown in a greatly exaggerated state in FIG. 4. The embossing is necessary to finished rail 13 a thickness dimension which will allow it to be used with existing metal rail hardware and processing equipment. In the presently preferred embodiment, the metal strip is approximately 0.018" thick and the fabric approximately 0.055" thick when glued together in the apparatus of FIG. 1. This forms a total assembly which is 0.080" thick or greater. If this thickness is not subsequently reduced, it would not be able to be cut off or fabricated in standard processing equipment. Therefore, the process of the present invention includes the step of thoroughly compressing the fabric so as to actually emboss the heavier threads into the metal substrate and generally produce an overall laminate thickness of about 0.06" as it exits from the rollers 24 and a final thickness of about 0.04" or smaller as it exits from the rollers 30.

Figure 19:
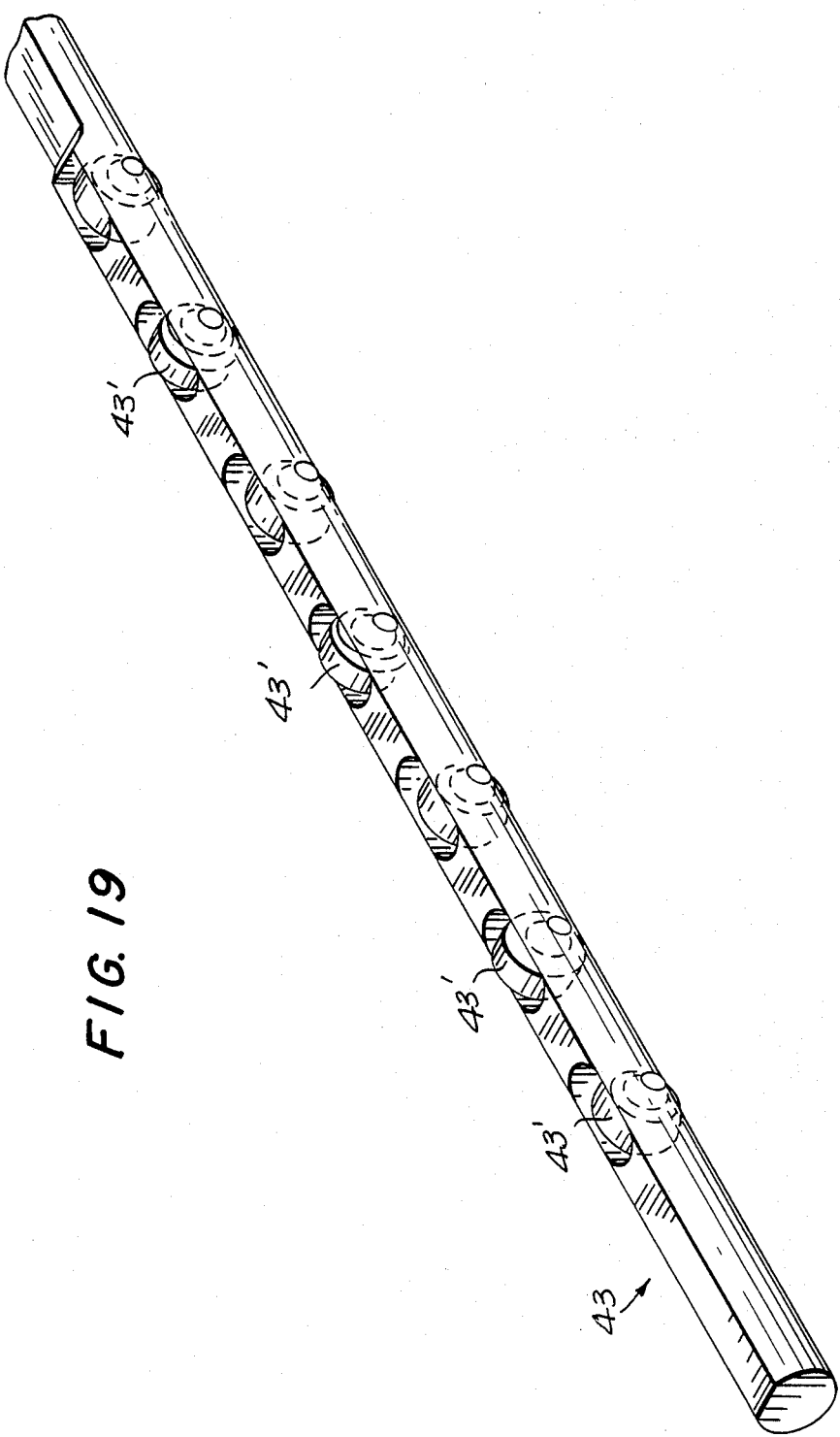
FIG. 19 is a schematic view of the mandrel used in the present invention.

At the end of the roll forming and compression operations as performed by the first set of roller dies 24–30, the open tube shape of the rail permits feeding of the rail over a mandrel 43 shown in FIG. 19. This mandrel is mounted at one end on the mandrel support 44, shown in FIG. 2, and extends inside the rail from just after the last roller die 30, through a second set of roller dies 45–48 and then through a set of lockseam compression roller dies 49–52. The mandrel 43 provides an anvil against which the lockseam roller dies 49–52 act to compress the lockseam to close it. In order to counteract friction between the mandrel 43 and the rail, wheels 43, are provided. These wheels run against the top and bottom inside surfaces of the rail in opposition to the lockseam roller dies 49–52.

The lockseam parts are shown in FIG. 13 as they appear just before being closed by the lockseam roller dies 49–52. Although, in the preferred embodiment, the edge 42 of the fabric should align at X (FIG. 3) in an area generally beginning at the point of the lockseam bend 33, it can extend for as much as 45 degrees into the arc of this bend. In this regard, the initial positioning of the fabric strip 12 on the metal strip 11 is important. If the fabric extends significantly beyond points X then it will extend beyond the bend 33 and prevent a proper lockseam from being formed. If the fabric falls short of this point, particularly X, then metal will be exposed along the lockseam which would detract from the appearance of the rail.

Similarly, in the case of the edge 41, it is very critical that it does not extend beyond the point Y (FIG. 3). This edge should align with the bottom of the step 36 and be located inwardly of the second lockseam part 40. This insures that the fabric does not enter the lockseam area at all and yet is positioned relative to the lockseam in a manner such as to minimize the probability of either frayed edges or exposed metal.

Figure 14:
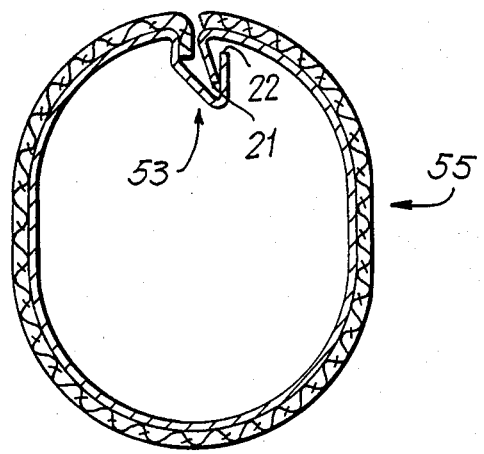
FIG. 14 and 15 show cross-sections of the rail along lines 14—14 and 15—15 at different positions along the locking head roller dies.
Figure 15:
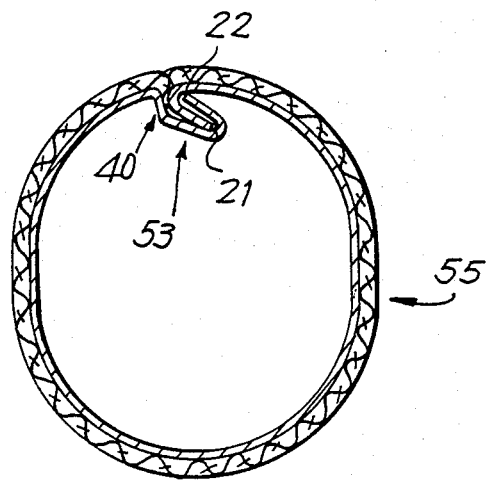
Figure 16:
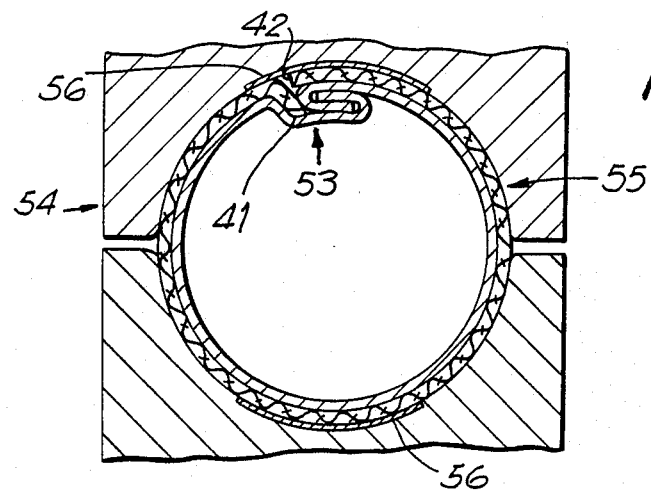
FIG. 16 shows a cross-section of the rail along lines 16—16 after leaving the locking head roller dies and after taping.

A lockseam 53 is actually formed by the lockseam compression roller dies 49–51 by progressively closing the lockseam parts 37 and 40 as shown in FIGS. 14, 15 and 16. These views show the lockseam at the first and second of compression roller dies 49 and 50 while FIG. 16 shows the rail at the subsequent tape applicator device 54. The shape of the rail at the last roller die 52 of the lockseam roller dies is basically the same as at the tape applicator device 54.

In the presently preferred embodiment, the final construction of the lockseam 53 as shown in FIG. 16 will have the edge 41 of the fabric at the bottom of the step 36 and the edge 42 of the fabric abutting the fabric disposed along the step. With this construction, no metal is exposed along the lockseam 53. Furthermore, with this positioning of the edges 41 and 42 of the fabric, the lockseam is formed with roughened metal to metal contact along three surfaces of the U-shaped lockseam parts 37 and 40, and no fabric extends into the lockseam proper.

After a closed tubular rail 55 is formed, adhesive tape 56 is applied and hot melted over the lockseam and to areas of the rail 55 which will be significantly bent in the final forming step. Strip heaters 56 are included as part of the tape applicator device 54 to melt the adhesive and capture any fibers which might be frayed along the lockseam or become frayed or otherwise exposed in the final forming step or tend to pull away from the rail surface. More particularly, the adhesive tape 56 applied along the lockseam and the areas which will be subsequently formed into the sharply bent concave areas along the top and bottom of the rail where fabric might become frayed or loose because of the concave bends. This adhesive is, however, not discernible on the finished rail.

Figure 17:
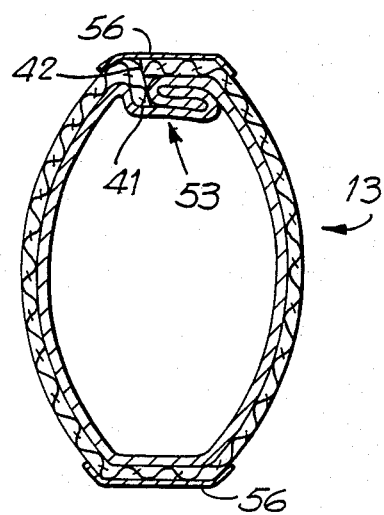
FIGS. 17 and 18 show cross-sections of the rail along lines 17—17 and 18—18 at the first and last of a set of crushing rollers dies.
Figure 18:
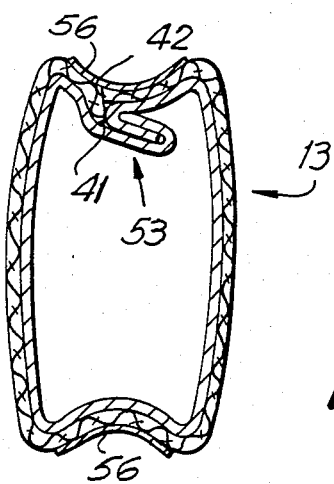

In the final forming step, crushing roller dies 57–59 crush the closed tubular rail 55 into the final form 13 shown in FIG. 4. As here shown and as shown in FIG. 18, the final rail structure has convex sides and concave top and bottom with the lockseam located internally of the concave top. Also, the adhesive tape 56 is located within the concave top and bottom to keep the fabric in place. Progressive cross-sections of the rail at roller dies 57 and 59 are shown in FIGS. 17 and 18. After final forming, the rail 13 is cut to desired length by a cut-off machine 60.

In order to protect the appearance of the fabric the entire process must be performed without any external lubrication on the rail. In the absence of such lubrication the inherent slipperiness of the fabric strip 12 provides sufficient lubrication between the forming rollers and the rail. The rail 13 produced by this process has fabric 12 which completely surrounds the metal 11 leaving no seams which would detract from the appearance.

What is claimed is:

1. A method for forming a fabric covered metal tubular blind rail, comprising the steps of:
    (a) laminating together an elongated fabric strip and an elongated thin metal strip to form a laminated strip with the longitudinal edges of the fabric strip extending along and spaced inwardly of the longitudinal edges of the metal strip to provide exposed longitudinal side portions in the metal strip;
    (b) roll forming the laminated strip into a tubular shape by passing the laminated strip longitudinally through a series of roller dies; and (c) bending each of the longitudinal side portions of the metal strip into U-shaped lockseam parts joined to each other in a lockseam.

2. The method as in claim 1, wherein the roll forming step (b) includes the steps of:
   (a) gradually compressing and embossing the fabric strip into the metal strip as it is fed through the roller dies.

3. The method as in claim 2 wherein the fabric strip is reduced in thickness during the compressing and embossing steps.

4. The method as in claim 3 wherein the fabric strip is reduced in thickness from a thickness about three times the thickness of the metal strip to a thickness which together with the thickness of the metal strip is about twice the thickness of the metal strip.

5. The method as in claim 1, wherein the roll bending step (c) includes the step of:
   (a) forming the lockseam with interlocking first and second U-shaped lockseam parts in the laminated strip to create a closed tubular rail with the first U-shaped part being interlocked in overlying relation with the second U-shaped part.

6. The method as in claim 1, which includes the step of:
   (a) locating the longitudinal edges of the fabric strip on the metal strip spaced from the longitudinal edges of the metal strip to avoid fabric to fabric contact in the lockseam.

7. The method as in claim 4 which includes the step of:
   (a) locating the longitudinal edges of the fabric strip on the metal strip so as to completely cover the outer exposed surface of the formed rail.

8. The method as in claim 7, wherein:
   (a) the fabric strip is located with one edge disposed at a location on the metal strip which corresponds to about the bend formed by the first U-shaped lockseam part, and its other edge is disposed at a location spaced from where the second U-shaped lockseam part is disposed.

9. The method as in claim 8 wherein:
   (a) the lockseam is formed with three metal to metal surface contacts of the U-shaped lockseam parts; and
   (b) the longitudinal side portions of the metal strip are roughened prior to forming the lockseam to enhance the lockseam.

10. The method as in claim 8 wherein:
    (a) the metal strip is formed with a step spaced inwardly of the second U-shaped lockseam part;
    (b) the edge of the fabric adjacent he second U-shaped lockseam part extends over the step; and
    (c) the other edge of the fabric abuts against the fabric extending over the step.

11. The method as in claim 1, wherein:
    (a) the rail is formed to a final shape with convex sides and concave top and bottom with the lockseam formed in the concave top; and
    (b) an adhesive tape material is applied to the fabric strip over the area of the lockseam and over the areas to be subsequently formed into the concave top and bottom.

* * * * *